Feb. 18, 1964     E. A. PHILLIPS     3,121,243
AIRPORT PASSENGER WALKWAY
Original Filed April 25, 1958     4 Sheets-Sheet 1
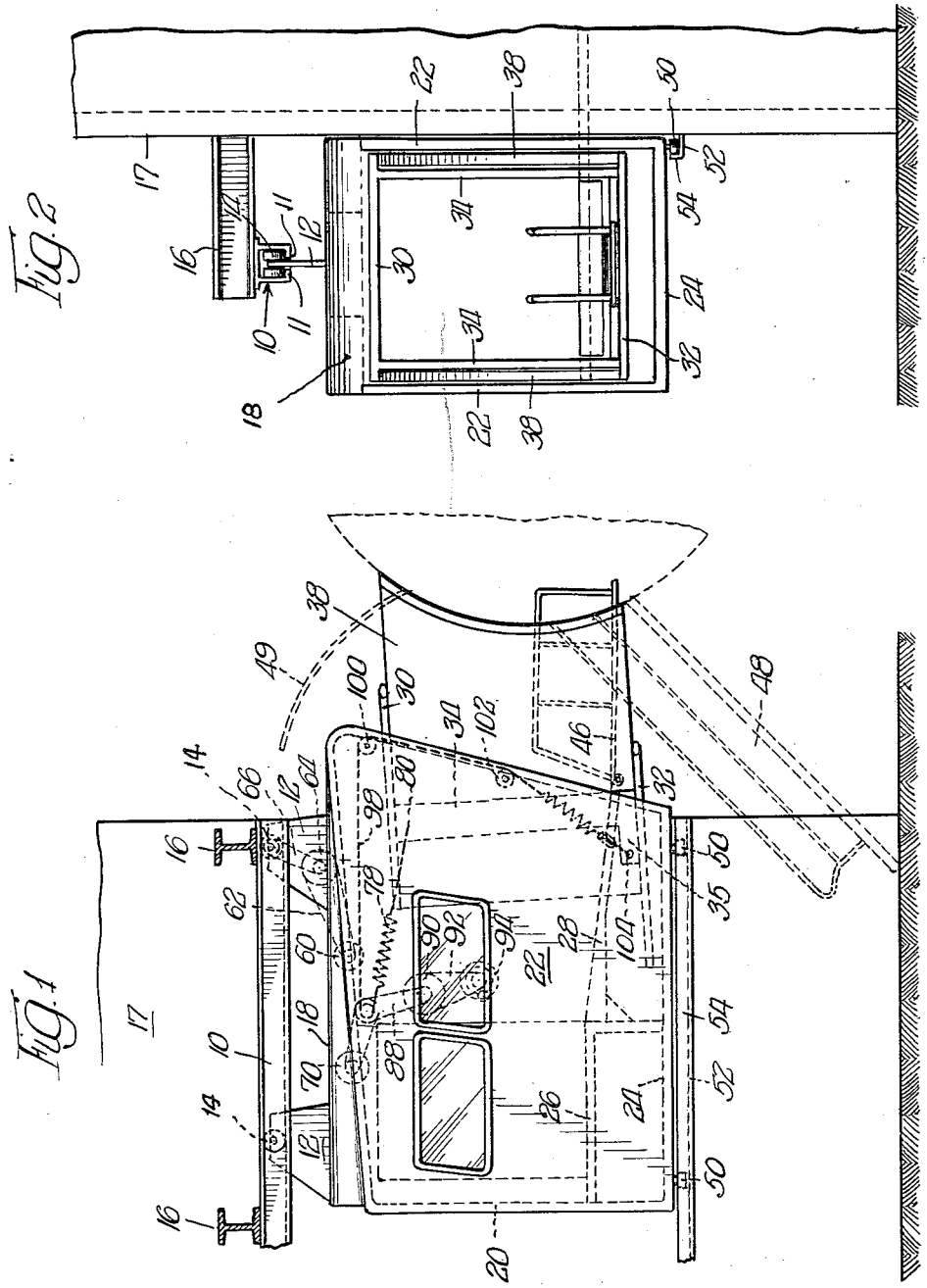
INVENTOR.
Earl A. Phillips,
BY Sabin C. Bronson.
Atty.

Feb. 18, 1964  E. A. PHILLIPS  3,121,243
AIRPORT PASSENGER WALKWAY
Original Filed April 25, 1958  4 Sheets-Sheet 2
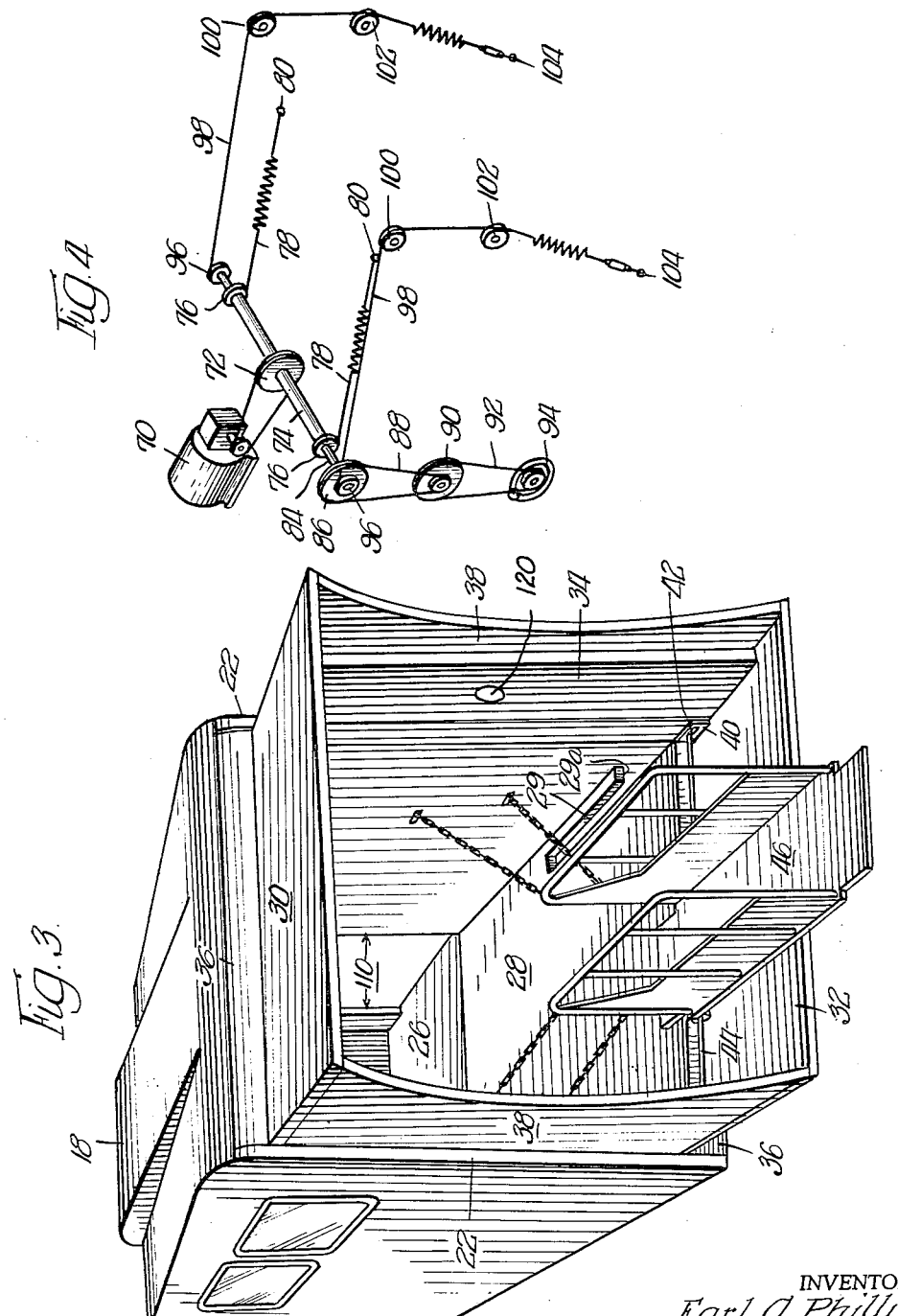
INVENTOR.
Earl A. Phillips,
BY Sabin C. Bronson
ATTY Feb. 18, 1964  E. A. PHILLIPS  3,121,243
AIRPORT PASSENGER WALKWAY
Original Filed April 25, 1958  4 Sheets-Sheet 3
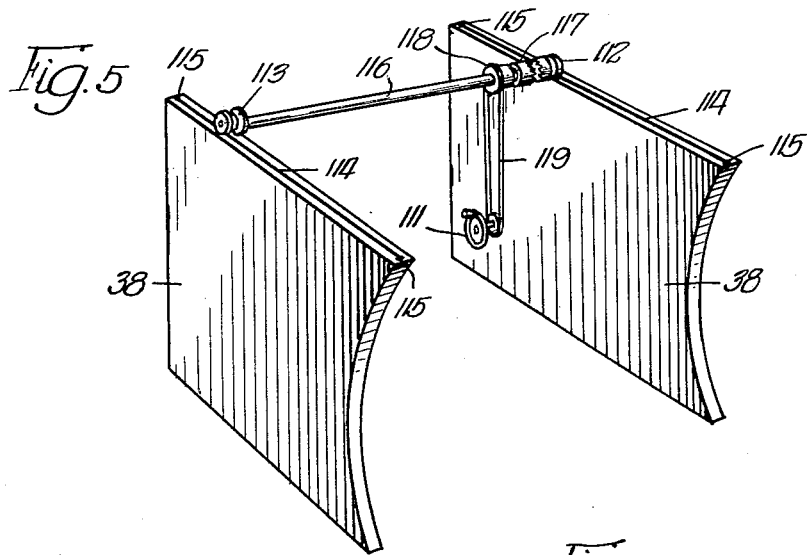
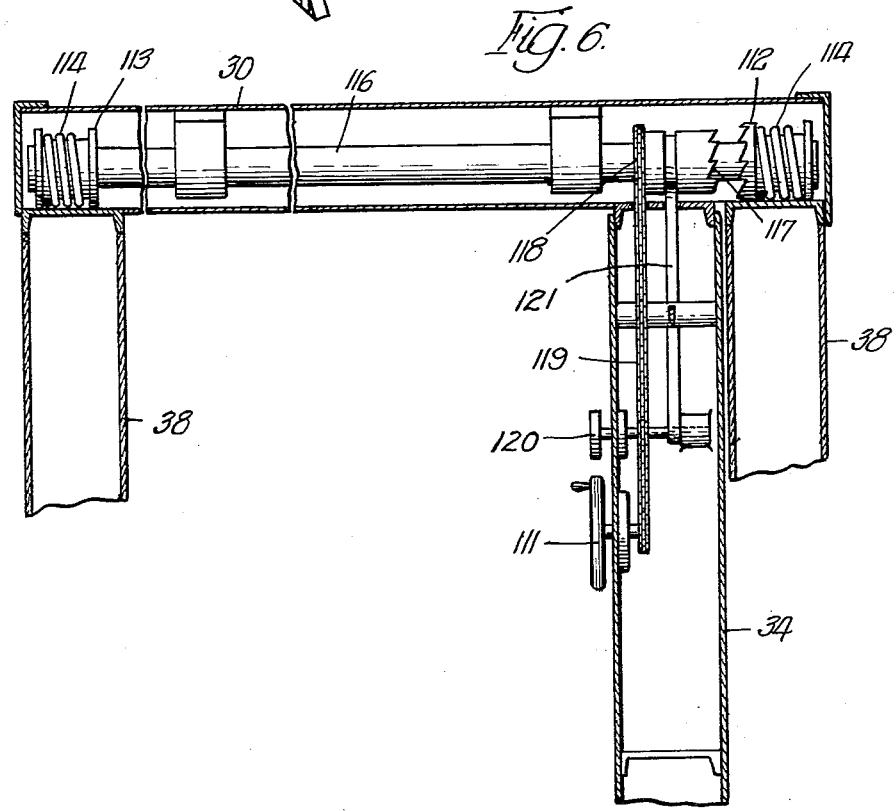
INVENTOR.
Earl A. Phillips,
BY Sabin C. Bronson
atty.

Feb. 18, 1964 E. A. PHILLIPS 3,121,243
AIRPORT PASSENGER WALKWAY
Original Filed April 25, 1958 4 Sheets-Sheet 4
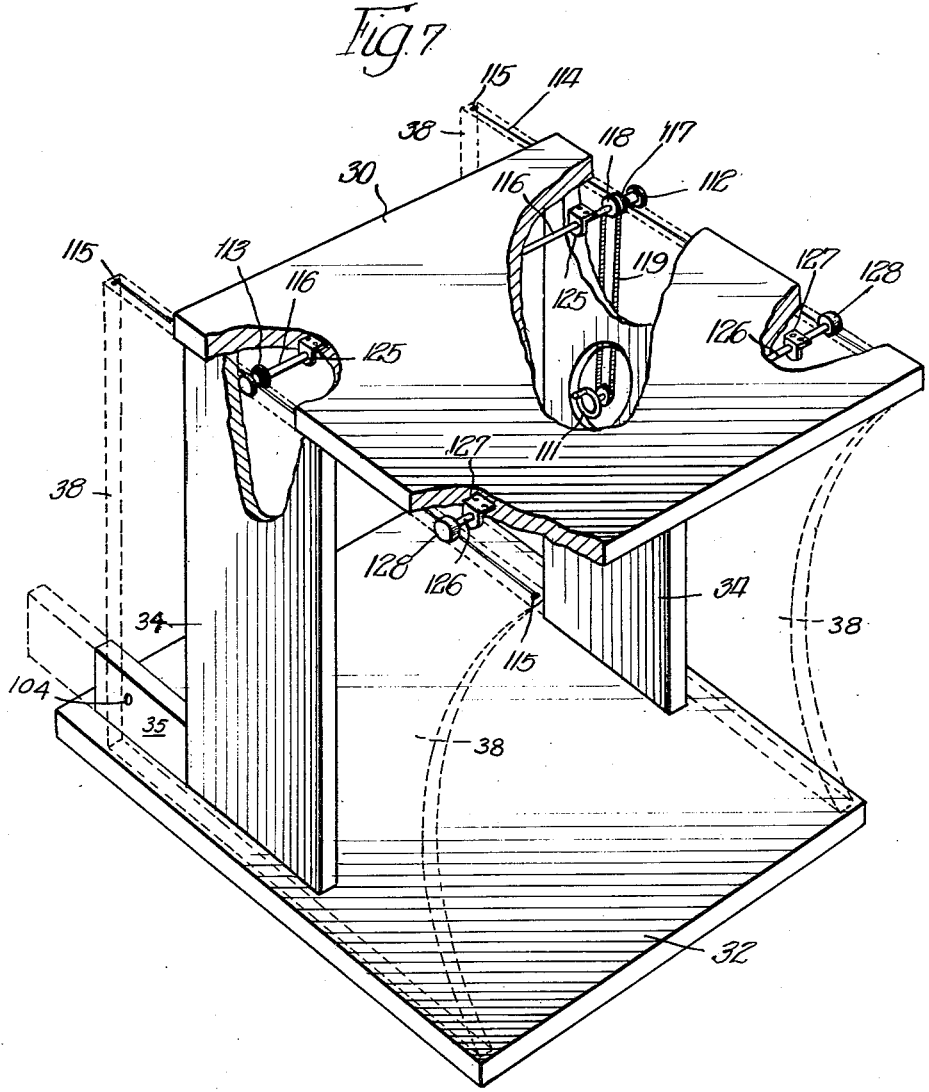
INVENTOR.
Earl A. Phillips,
BY Sabin C. Bronson
ATTY.

United States Patent Office 3,121,243
Patented Feb. 18, 1964

3,121,243
AIRPORT PASSENGER WALKWAY
Earl A. Phillips, La Grange Park, Ill., assignor to Standard Railway Equipment Manufacturing Company, Chicago, Ill., a corporation of Delaware
Continuation of application Ser. No. 730,893, Apr. 25, 1958. This application Dec. 20, 1961, Ser. No. 162,308
12 Claims. (Cl. 14—71)

This invention relates to a device for loading and unloading aircraft and more particularly to an aerial walkway or bridge to provide a convenient and readily adjustable means for passengers to board and embark from an aircraft.

It is an object of the present invention to provide a walkway or bridge suspended from the side of an airport wall and movable therealong to a second story door so that passengers, etc. may pass therethrough, over the walkway or bridge, and directly into the aircraft. This eliminates the necessity of movable stairways which must be rolled across the ground to the aircraft.

With the advent and increasing use of the larger jet-propelled aircraft, means are provided to taxi the same to adjacent the airport terminal. The walkway of this invention may then span the distance from the aircraft to an upper story door of the terminal building, thus facilitating the flow of passengers to and from the aircraft.

It is a further object of the invention to provide a suspended walkway for the rapid movement of passengers to or from the aircraft, which walkway is high enough above ground so that movement of luggage, etc. may take place on the ground apron under the walkway with no interference from passengers.

It is a further object of the invention to provide the walkway with a flexible connection to the door of the aircraft so that any of several types of aircraft may be served by the device. Further, this flexible connection will maintain a sealed condition around the aircraft doorway when any sway or vertical motion of the aircraft occurs during loading or unloading.

Other objects and advantages of the invention will be apparent from the following description thereof having reference to the accompanying drawings, illustrative of one embodiment of the invention, and wherein like reference characters indicate like parts.

In the drawings:

FIGURE 1 is a side elevational view of a preferred embodiment of the invention showing the same extended for contact with an aircraft doorway.

FIGURE 2 is an end view showing the invention alongside the airport terminal.

FIGURE 3 is a perspective view of the walkway or bridge itself showing the gangplank and suspended end structure of the device.

FIGURE 4 is a perspective view of the power and linkage arrangement for operating the several parts of the walkway.

FIGURE 5 is a perspective view of the mechanism for moving the sidewall portions of the end structure of the device.

FIGURE 6 is a broken side elevation, somewhat enlarged, of the mechanism shown in FIGURE 5, showing the location of same in the roof and walls of the device, and vertical section through the end structure portion of the device.

FIGURE 7 is a perspective view of the suspended end structure.

As will be seen from FIGURE 1, an overhead rail or trackway 10 is provided which comprises essentially a structural member having a pair of flanges 11 extending toward each other but with a space therebetween sufficient to permit the plate-like brackets 12 to conveniently slide therebetween. The upper ends of these brackets are provided with a pair of rollers 14, one on each side of the bracket, which rollers roll on the flanges 11. The rollers are mounted on a common horizontal axis transverse to the longitudinal axis of the rail 10, providing a sort of trolley suspension for the brackets. The overhead rail is secured to the underside of a plurality of beams 16 extending out from the terminal building 17 at least half the width of the walkway so that it can be suspended from the longitudinal center thereof. The lower edges of the brackets 12 are secured in any satisfactory manner to the roof structure 18 of the walkway along the longitudinal center thereof.

At the edge of the floor 24 adjacent the building are a plurality of rollers 50 mounted for rotation on vertical axes within an angularly-shaped rail 52 secured to the building wall and having a vertically disposed restraining flange 54 so that the rollers cannot jump out of the rail 52. The rails 10 and 52 thus provide adequate rolling support for the device.

The walkway itself comprises a rectangular structure including the roof 18, end wall 20, side walls 22—22 and floor 24. Most of the components of the walkway are of aluminum to provide as light weight a structure as possible. The right end of this structure as shown in FIG. 3 is open.

Within this main walkway structure is a false floor indicated at 26 spaced above the floor 24. The forward portion 28 of this false floor inclines downwardly forming a ramp between portion 26 and the open end of the walkway. There is thus a space between the false floor and the main floor 24. At opposite sides of the forward margin of the ramp portion 28, are provided slots 29 (FIG. 3).

Within and adjacent to the open end of the walkway is a spring suspended, and hence free floating, structure made up of three separate sections. One section of the floating end structure includes a roof portion 30, a floor portion 32 and narrow connecting side wall portions 34. These side wall portions 34, it will be noted, are J-shaped at the bottom, the lower rear portions having rearwardly extending portions as shown at 35 in FIGS. 1 and 7. This is to provide a more rearward point for the attachment at points 104—104 of the spring cables 98—98. The second and third sections are the two outside side walls 38. These side walls 38 are spring suspended from the main structure as will be described later; and the section comprising the roof 30, floor 32, and inner walls 34 is mounted on the outer walls 38 on roller pulleys 112 and 113 and can be moved in and out relative to the walls 38. This also will be described later.

This spring suspended end structure supports no weight, other than itself, consisting of the three sections, one comprising the roof 30, floor 32 and narrow side walls 34, the other two sections being the two independently movable wall sections 38—38. The vertical dimension of this suspended end structure is somewhat less than the vertical dimension of the main section. Neoprene coated or other suitable weather flaps 36—36 are provided to cover the space between the roofs and floors of the two sections so as to exclude as much of the elements as possible. The side edges of the roof 30 and floor 32 of the suspended section extend over the top and bottom edges of the connecting walls 34—34 (see FIG. 2) to the walls 22—22 of the main section providing a narrow space between walls 34—34 and walls 22—22. In this space on both sides of the structure are independently mounted the vertically disposed side walls 38 which support the previously referred to section consisting of roof 30, floor 32 and inner walls 34—34. These walls 38—38 are in turn supported by the hereinafter described spring cables 98—98, one of the ends of each of which are attached to the pulleys 96—96, and the other ends of each of which are attached at 104—104 to the side walls 38—38. Walls 38 extend vertically between the overhanging edges of the roof 30 and the floor 32 but are not connected thereto. When pushed rearward within the walkway, say by pressure from the aircraft, the lower margins thereof abut against the ends 29a of the ramp material 28 forming the outer edges of the slots 29. The outer ends of the walls 38 are arcuate to approximate the curvature of the aircraft with which the device is used, as clearly indicated in FIGURES 1, 3, 5 and 7. Thus when the walkway is serving an aircraft these side walls fit rather snugly about the vertical margins of the aircraft doorway, and the roof 30 and floor 32 of the floating structure fit the top and bottom of the doorway respectively, providing an enclosed walkway from the aircraft to the terminal building.

A flat strap bracket 40 is recessed within and secured to the outer corners of the ramp portion 28 so that the outer surface of said bracket is coplanar with the inner edge of said slot 29. Bracket 40 projects beyond the outer edge of the ramp 28 and an elongated opening 42 is formed in the projecting portion, the longer axis of which is disposed in the plane of the ramp 28. Within these slots 42 are mounted the ends of a rod 44, which rod extends across the front edge of the ramp 28 below the upper surface of said ramp. A gangplank 46 is pivotally and slidably mounted adjacent one end on said rod 44, said end overlapping the adjacent end of the ramp 28, and being hinged to the gangplank. The slots 40 permit the gangplank 46 and rod 44 to be movable in and out and also to be pivoted in the plane of ramp 28. The other end of the gangplank 46 is adapted to rest upon the threshold of an aircraft doorway, as indicated in FIGURE 1. Convenient handrails are provided as is common in such gangplanks.

When the device is not in use the gangplank 46 may be pivoted upwardly on shaft 44, see FIGURE 3, so that it then rests on the ramp 28 within the walkway. Since the gangplank may be slid laterally on the shaft 44 and may also be angled somewhat within the limits of the slots 42, considerable freedom is provided for locating it into the doorway of the aircraft.

The device is adapted to serve jet aircraft, of the "Electra" and the "707" type. The normal door sill height of the Electra is 8'5" from the ground, whereas that of the "707" is 10' which approximates the height of the terminal building second floor level. The Electra is also provided with loading stairs as indicated in dotted lines FIG. 1 at 48. These are carried within the plane, and the door thereof is hinged across the top and may be swung outwardly about 180° as indicated in FIG. 1 at 49. Thus, when applicant's device is serving an Electra, the roof 30 and floor 32 of the floating end will have to be withdrawn out of the way of the door 49 and stairs 48. When so withdrawn, the side walls 34 slide back within the slots 29, and the floor 32 slides within the space between the ramp 28 and floor 24. The gangplank 46 in this instance then rests upon the upper end of the stairs as shown.

To operate the walkway forward and backward along the terminal wall, there is provided on the roof of the structure a drive motor indicated at 60 for driving one of the wheels 14. This drive motor is provided with a pulley which is connected by belt 62 to wheel 64, the reducing pulley of which wheel 64 is connected by belt 66 to wheel 14. Thus the motor 60 through the belt and pulley connections just mentioned drives the device along rails 10 and 54, from controls within the structure, which include suitable reversing switches, etc.

In FIGURE 4 the means for operating the suspended end structure is diagrammatically illustrated. A motor is shown at 70 which drives a sprocket 72 mounted on a sleeve or hollow tube 74, on the ends of which sleeve are a pair of wind-up reels 76. One of the ends of a pair of spring cables 78 is attached to reels 76 and the other ends are fixed to the upper portion of the walls 38 at points as indicated at 80. All of the rotatable elements diagrammatically shown in FIGURE 4 are mounted in the walkway section comprising the roof structure 18, walls 22—22 and floor 24. The motor 70 is mounted in the roof structure 18. Means are provided for both tilting the end structure approximately about points 104—104 and for vertically translating it. The tilting is accomplished by operation of the motor to wind up the spring cables 78, the suspended end structure will be tipped up, rotating about a horizontal axis running approximately through points 104—104; and when the motor is reversed, the suspended end structure will be tipped downwardly. This is to accommodate aircraft doorways which vary in height from the ground.

While the above described mechanism provides for tilting of the floating end structure, an entirely independent mechanism is provided for raising and lowering the floating end structure in vertical translation, which will now be described.

Extending through the sleeve 74 is a shaft 84 the ends of which shaft 84 project outwardly beyond the sleeve 74 and are mounted in suitable bearings in the side walls of the walkway. On shaft 84 is mounted a sprocket 86, which is connected by chain 88 to reducing sprocket 90, which latter sprocket is connected by chain 92 to hand wheel sprocket 94. On shaft 84 are also mounted a pair of wind-up reels 96 to which one of the ends of the spring cables 98 is attached. These cables 98 operate over the sheaves 100 and 102 and are secured at their other ends to the lower inner ends of walls 38 at points indicated at 104. Thus when the hand wheel 94 is operated, the floating end structure of the walkway may be raised or lowered in vertical translation as desired.

The two pairs of spring cables 78—78 and 98—98 are the only support for the suspended end structure. The tension force of these two pairs of spring cables and the weight of the suspended end structure acting down through its center of gravity in the plane thereof are the only three forces acting on the end structure. The end structure will assume an equilibrium, a position such that the lines of action of these three forces intersect at a common point, this being a necessary criterion for an equilibrium. This equilibrium point is not a fixed point relative to the end structure, but it moves about depending upon the amounts the spring cables 98—98 and 78—78 are wound up. Once, however, particular amounts of wind-up are given the spring cables, the end structure assumes a certain equilibrium position of tilt and translation relative to the main section of the walkway, such equilibrium position being characterized always by the fact that the three forces (two spring cables plus dead weight) have lines of action that intersect at said equilibrium point. This equilibrium position of the end structure is attained by the operator who tilts hand wheel 94 and runs motor 70 until a particular equilibrium position is reached which is compatible with the height and type of aircraft served. After establishing this equilibrium position, the operator then drives the walkway into contact with the airplane, causing the ends of sidewalls 38—38 to snugly fit the fuselage contour. Any subsequent motion of the airplane, such as downward settling as it is loaded, or sidewise lurching due to wind, is absorbed by the floating end structure moving away from its equilibrium configuration. The position of the end structure in turn can be varied by the previously described mechanism operating spring cables 98—98 and 78—78. The fact that the entire end structure is spring supported insures that it is free to move in any direction in the vertical plane of its side walls 38, upon application of an external force, such as would be applied by an airplane contacting the outer edge thereof.

When serving planes of various heights, the end structure is pivoted about points 104 by motor 70 and spring cables 78—78. This pivoting feature assures adequate headroom clearance between ramp 28 and roof 30 at all times. Minor vertical movement of the floating end structure can also be had if required by rotating hand wheel 94 which activates spring cables 98—98.

In FIGURE 3 it will be noted there is an opening indicated at 110 through the wall 22 adjacent the terminal building which functions as an entrance or exit doorway when the walkway is moved to opposite a door of the terminal building.

Reference is now made to FIGS. 5, 6 and 7 which illustrate the mechanism used to retract the section comprising the floor 32, roof 30 and inner walls 34 relative to the side wall sections 38—38. This retractable section is roller mounted on side walls 38—38. A shaft 116 is mounted on the roof 30, adjacent the rear edge thereof in suitable bearings 125 secured to the roof 30. The ends of shaft 116 extend over to the top edge of side walls 38—38, and are provided with combination roller pulleys 112 and 113, the one 113 being fixed to the end of the shaft 116 and the one 112 being freely mounted on said shaft. A second shaft 126 is mounted in suitable bearings 127—127 on the roof adjacent the forward edge thereof on which shaft are freely rotatable rollers 128—128. The rollers 112—113 and 127—127 roll on the upper edge of the walls 38—38, thereby reciprocably supporting the section consisting of the roof 30, floor 32 and side walls 34—34. The roller pulleys 112 and 113 drive the two cables 114 which are attached to walls 38 at points 115 and which are wound around the roller pulleys as shown. A clutch 117 is keyed to shaft 116 and by pulling the knob 120 on a shaft attached to lower end of lever 121 pivoted between its ends, the clutch 117 can either engage pulley 112 so that both pulleys 112 and 113 are driven together, or it can disengage pulley 112 so that only pulley 113 is driven and the right wall 38 is freed from the drive system. The drive in either case is produced by turning handwheel 111 which turns the sprocket 118 through the chain 119. Sprocket 118 is an integral part of the clutch, which in turn is keyed to the shaft 116. Thus the turning of handwheel 111 always causes shaft 116 and pulley 113 to rotate, but pulley 112 rotates only when the clutch is engaged. When the operator desires to retract or extend the section comprising the roof 30, floor 32, and side walls 34—34 relative to the side walls 38—38, he engages the clutch with pulley 112 and turns handwheel 111. After obtaining the desired position, he releases the clutch and this frees the right wall 38 from the drive system and from the left wall 38. The object of this freedom is to provide a means for the two walls 38—38 to seek their own individual forward positions when contacting various aircraft. For example, the two walls must be approximately equally far forward when contacting the Electra, but the right wall must extend farther than the left wall when serving the "707" because the contour of the "707" slopes inward toward the nose at the location of the passenger door.

From the foregoing the operation of the walkway should be obvious. The operator enters the walkway through the opening 110 and if an "Electra" is arriving, he retracts the roof 30, floor 32 and inner walls 34—34 of the floating end structure and tilts the end structure slightly downwardly. If it is a "707" that is to be served, he leaves the roof and floor of the floating end structure in extended position and tilts the end structure slightly upwardly. Then the operator advances the whole structure along the side of the building until opening 110 is opposite a door of the terminal. Since the plane is towed to position adjacent the end of the terminal wing when the opening 110 is opposite a door, the floating end will be contacting the plane and surrounding the door thereof. The operator then opens the plane door, lowers the gangplank into place with the outer end resting on the plane door threshold, and the device is then in position for the passengers to move to or from the plane.

The foregoing describes the make-up of the floating end structure when designed to serve aircraft with projecting elements such as the stairs 48 and door 49 in FIG. 1. These projections make it necessary to retract the floor 32 and roof 30 to provide proper openings. Now if the particular aircraft to be served does not have these projections, such as is the case with the "707" and "DC-8," the floating end structure can be greatly simplified in design by the removal of the retractable feature of the floor, roof, and inner side walls. In this case, the floating end will consist of only one solid structural unit comprised of the floor 32, roof 30, and side walls 38—38. The inner walls 34 will be eliminated along with the slots 29 in ramp 28 and the drive mechanism shown in FIGS. 5, 6 and 7. This four sided end structure will be spring suspended from the main section in the same manner as described in reference to FIG. 4. The advantages of the floating characteristics are nevertheless maintained.

This application is a continuation of my pending application, Serial No. 730,893, filed April 25, 1958 and now abandoned.

I claim:

1. An airport passenger loading and unloading arrangement comprising a trackway supported in parallel relationship to a building wall, a walkway housing rollably suspended from said trackway, an end structure telescopically mounted within said walkway housing, spring means supporting said end structure from said walkway housing, said end structure being shaped at its outer end to fit about the periphery of an aircraft doorway, pivot means secured to the end of the walkway housing in parallel relationship thereto, and a gangplank slidably and pivotally mounted on said pivot means and extendable outwardly for spanning the distance from said walkway housing to the threshold of said aircraft doorway.

2. The structure of claim 1 and manually operable means for adjusting the end structure for engagement about the doorway of an aircraft.

3. An airport passenger loading and unloading arrangement comprising a trackway supported in parallel relationship to a building wall, a walkway housing rollably suspended from said trackway, an end structure telescopically mounted within said walkway housing, spring means suspending said end structure from said walkway housing, said end structure being shaped at its outer end to fit about the periphery of an aircraft doorway, means for rolling said walkway housing along said trackway, means for moving said end structure from said walkway housing toward engagement with an aircraft, a gangplank for spanning the distance from said walkway housing to the threshold of said aircraft doorway, and means for slidably and pivotally mounting said gangplank on the lower outer end of said walkway housing.

4. An airport passenger loading and unloading structure comprising a trackway supported in parallel relationship to a building wall, a walkway housing rollably suspended from said trackway, an end structure telescopically mounted within said walkway housing, said end structure comprising one portion having substantially parallel side walls, and another portion having floor, ceiling and narrow conencting walls rollably supported on said side walls, said side wall portion being pivotally suspended from said walkway housing for pivotal movement on a transverse axis, means for tilting said side walls, means for elevating or lowering said pivot and side walls, means for rolling said floor, ceiling and connecting wall portion on said side wall portion, said side walls of said one portion being shaped at their outer ends to fit against an aircraft, said walkway housing being provided with elongated openings at its lower outer ends, a transverse pivot shaft mounted at its ends in said elongated openings, and a gangplank slidably and pivotally supported on said pivot shaft and extending outwardly to span the distance from the walkway housing to said aircraft.

5. An airport passenger loading and unloading arrangement, comprising a trackway supported adjacent to a building wall, said building wall having a doorway therein, facing said trackway, a walkway housing rollably supported by said trackway for movement therealong, said housing having a doorway therein, registrable with said building wall doorway, means for moving said walkway housing along said trackway, an end structure, spring means suspending said end structure from said walkway housing, and means for moving said end structure relative to said walkway housing, whereby said end structure may be moved within the limits of and relative to said walkway housing in directions parallel to the plane of the side walls of the walkway housing.

6. An airport passenger loading and unloading arrangement, comprising a trackway suppported adjacent to a building wall, said building wall having a doorway therein, facing said trackway, a walkway housing rollably supported by said trackway for movement therealong, said housing having a doorway therein, registrable with said building wall doorway, means for moving said walkway housing along said trackway, an end structure adjustable spring cable means suspending said end structure from said walkway housing, whereby said end structure may be moved within the limits of and relative to said walkway housing in directions parallel to the plane of the side walls of said walkway housing from its equilibrium point of adjustment, and means for moving said end structure relative to said walkway housing.

7. An airport passenger loading and unloading arrangement, comprising a trackway supported adjacent to a building wall, said building wall having a doorway therein, facing said trackway, a walkway housing rollably supported by said trackway for movement therealong, said housing having a doorway therein, registrable with said building wall doorway, means for moving said walkway housing along said trackway, an end structure within said walkway housing, independently movable side walls, said end structure being movably supported on said side walls and being suspended within said walkway housing by adjustable spring cables attached to said movable side walls, means for moving said side walls independently of each other, of said end structure, and of said walkway housing.

8. The structure of claim 7 and adjustable means for moving said end structure relative to and in the plane of the side walls of said walkway housing.

9. An airport passenger loading and unloading arrangement, comprising a trackway supported adjacent to a building wall, said building wall having a doorway therein facing said trackway, a walkway housing rollably supported by said trackway for movement therealong, said housing having a doorway therein registrable with said building wall doorway, means for moving said walkway housing along said trackway, an end structure, adjustable cables suspending said end structure from said walkway housing, whereby said end structure may be adjusted within the limits of and relative to said walkway housing in directions parallel to the plane of the side walls of the walkway housing, springs in series with said cables, whereby said end structure will further be free floating in said plane from its equilibrium point of adjustment.

10. The arrangement of claim 9, wherein said end structure comprises a floor, ceiling and two vertical walls, said adjustable cables with said springs in series therewith being attached to said two vertical walls.

11. The arrangement of claim 9, wherein said end structure comprises two vertical walls, and another portion having floor, ceiling and narrow connecting walls rollably supported on said vertical walls, means, including rollers for rolling said floor, ceiling and connecting walls on said vertical walls, and pulleys, said adjustable cables with springs in series therewith being attached to said pulleys and to said vertical walls, whereby said another portion may be moved relative to said vertical walls.

12. The arrangement of claim 11, wherein said means for rolling said floor, ceiling and connecting walls on said vertical walls is provided with a clutch to allow optional rolling on one or both of said vertical walls.

No references cited.

UNITED STATES PATENT OFFICE
CERTIFICATE OF CORRECTION

Patent No. 3,121,243                                          February 18, 1964

Earl A. Phillips

It is hereby certified that error appears in the above numbered patent requiring correction and that the said Letters Patent should read as corrected below.

In the grant, lines 2 and 3, for "assignor to Standard Railway Equipment Manufacturing Company, of Chicago, Illinois, a corporation of Delaware," read -- assignor to Stanray Corporation, a corporation of Delaware, --; lines 12 and 13, for "Standard Railway Equipment Manufacturing Company, its successors" read -- Stanray Corporation, its successors --; in the heading to the printed specification, lines 3 to 5, for "assignor to Standard Railway Equipment Manufacturing Company, Chicago, Ill., a corporation of Delaware" read -- assignor to Stanray Corporation, a corporation of Delaware --; column 4, line 43, for "forecs" read -- forces --; column 6, line 64, for "conencting" read -- connecting --.

Signed and sealed this 30th day of June 1964.

(SEAL)
Attest:

ERNEST W. SWIDER                                   EDWARD J. BRENNER

Attesting Officer                                  Commissioner of Patents